ary Examiner* — Frank L. Abbott

United States Patent [19]
Friedman

[11] 3,865,189
[45] Feb. 11, 1975

[54] METHODS FOR SELECTIVE PLUGGING

[75] Inventor: Robert H. Friedman, Houston, Tex.

[73] Assignee: Getty Oil Company, Los Angeles, Calif.

[22] Filed: Apr. 1, 1974

[21] Appl. No.: 456,783

Related U.S. Application Data

[62] Division of Ser. No. 270,244, July 10, 1972, Pat. No. 3,811,508.

[52] U.S. Cl. ............... 166/294, 166/292, 166/305 R
[51] Int. Cl. ................................................ E21b 33/13
[58] Field of Search ........... 166/270, 288, 292–295, 166/300, 305 R

[56] References Cited
UNITED STATES PATENTS

| | | | |
|---|---|---|---|
| 2,079,431 | 5/1937 | Cannon | 166/294 |
| 2,090,626 | 8/1937 | Grebe | 166/294 |
| 2,238,930 | 4/1941 | Chamberlain et al. | 166/300 |
| 2,246,725 | 6/1941 | Garrison | 166/305 |
| 2,354,203 | 7/1944 | Garrison | 166/305 |
| 2,606,871 | 8/1952 | Ten Brink | 166/305 |
| 2,708,974 | 5/1955 | Fischer et al. | 166/294 |
| 3,358,757 | 12/1967 | Holmes | 166/270 |
| 3,404,734 | 10/1968 | Raifsnider | 166/270 |
| 3,757,863 | 9/1973 | Clampitt et al. | 166/270 |

*Primary Examiner* — Frank L. Abbott
*Assistant Examiner* — Jack E. Ebel
*Attorney, Agent, or Firm* — Arnold, White & Durkee

[57] ABSTRACT

Methods and compositions are provided for selectively plugging the water-rich strata of subterranean formations, including the injection into the formation of a water-soluble, oil-insoluble soap or ester. The soap or ester chemically reacts in the formation, either with reactants already in the formation or reactants which may be injected along with or prior to the soap or ester, to produce a water-insoluble, oil-soluble product which is effective to selectively plug the water-rich strata over a relatively long distance and over a relatively long period of time.

4 Claims, No Drawings

METHODS FOR SELECTIVE PLUGGING

This is a division of application Ser. No. 270,244, filed July 10, 1972, and now U.S. Pat. No. 3,811,508.

BACKGROUND OF THE INVENTION

In the drilling and production of fluid mineral deposits such as petroleum oil and gas from subterranean formations, the presence of water has been a continuing problem. In almost every subterranean formation wherein either petroleum oil or gas (hereinafter "oil") is present in quantities which make production practical, water is also present. Usually, certain portions or strata of an oil-bearing formation may be considered oil-rich, and other portions or strata of the formation may be considered water-rich. For definiation purposes of this application, those portions or strata containing more than about 45 percent oil will be termed "oil-rich," and those containing less than about 30 percent oil will be termed "water-rich." Those portions or strata having an oil concentration of between about 30 percent and about 45 percent will be termed "mixed" strata.

The connate water of the formation varies in mineral content from one location to another. Such water is frequently an aqueous brine solution. In many locations, the connate water contains magnesium and/or other metal salts.

Production of connate water along with oil from a producing formation is not desired for many reasons, among them being the extra production expenses encountered, the necessity for separation of the oil and water following production, and the fact that means, must be provided for getting rid of undesired brackish water which is a pollutant to the surrounding terrain.

The disadvantages of producing water with oil as mentioned above are relatively insignificant compared to the disadvantages faced when certain post-primary recovery processes, such as waterflood operations, are utilized in such formations. In accordance with such processes, it is customary to inject a driving fluid through one or more injection wells, and to produce oil through one or more producing wells. The well fluids are pushed by the driving fluids through the formation from the area of the injection wells to the area of the producing wells. By the very nature of such processes, a relatively large amount of the injected fluids will be produced at the producing well or wells. It is thus imperative that enough oil be produced through the producing wells along with the water (connate and injected) to make the process economical.

Another factor existing in many subterranean formations seriously complicates the undesired presence of water, i.e., the existence, within the formation, of gross differences in permeability. As is pointed out in the co-pending application of Friedman, Ser. No. 152,411, filed June 11, 1971, oil-bearing formations cannot be considered as having a homogeneous nature. It is well known that permeability profiles of pay sands show irregularities both horizontally and vertically. Oil-bearing strata may be separated by shale streaks which prevent vertical migration between them and provide independent paths between injection wells and producing wells. These independent paths will likely have differing effective permeabilities and generally speaking the water-rich portions or strata will be the more porous strata.

These and other factors result in the watering out of certain portions of an oil-bearing formation prior to the watering out of other portions during waterflooding. When this occurs, water passing through a watered-out stratum results in oil production at increasingly unfavorable water-to-oil ratios. This water by-passing often becomes a controlling factor in determining the final recovery which may be obtained economically by waterflooding operations. This is particularly true when the oil sand is highly hetergeneous.

The shape of the reservoir which is swept by an advancing front of injected fluid may be such that large quantities of theoretically recoverable oil will not be affected by a fluid flood. Thus, such oil might not be recovered because the flooding medium is preferentially channeled into other parts of the formation. Studies of reservoirs after waterflooding have indicated that two-thirds of the residual oil is frequently located in portions of the reservoir which waterflooding has not reached, while in the water-swept portions oil content may be near the irreducible minimum.

The economic significance of recovery operations of this type is great, and the problems as described above have been well recognized by the oil and gas production industry for many years. Many efforts have been made to solve the problems in whole or in part.

Generally speaking, there have been two basic approaches to the solution of the problem. One such approach is to seal off the water-rich strate at or adjacent to the borehole, as by the use of Portland cement. This method has proved satisfactory in some instances, but is most unsatisfactory and completely impractical in others, especially in many situations wherein there is significant vertical permeability between the varous strata of a formation.

Another approach suggested in the art is to selectively plug the more porous water-rich strata so that water from these strata will not be selectively produced or selectively swept by the driving fluid used in the post-primary process, or at least so that the oil-to-water ratio will be improved. The present invention is directed to this latter method, which is often called "selective plugging."

Various solutions have been proposed by the prior art for selectively plugging porous water-rich strata. A discussion of some of these prior art methods is found in the co-pending application of Friedman et al., Ser. No. 152,277, filed June 11, 1971, which relates to a selective plugging method and composition comprising in a preferred embodiment, sodium carboxymethylcellulose, chromium potassium sulfate, and orthocresol.

Some of the prior are solutions have been successful under certain conditions, but the need remains for other practical and inexpensive solutions to these long felt problems. Espciially the need remains for a selective plugging composition and method which will gradually plug and is effective over a large area or distance. Many of the selective plugging methods and compositions of the prior art have suffered from the defect that even though they may have plugged well, they did so only over a small area, thereby allowing the driving fluid in a post-primary process to by-pass the plugged portion and then re-enter the porous water-rich strata to present the same problem as outlined above.

Because of the expense of most potential injection fluids when compared to the oil which may be recovered, many such fluids are not practical or economical for use even though they may be technically efficient. Consequently, the need especially exists for a selective plugging composition and method of the type described above, which additionally is sufficiently inexpensive to justify its use.

Solutions to the above long-felt problems are provided by this invention.

SUMMARY OF THE INVENTION

This invention relates to selective plugging methods and compositions, wherein an inexpensive water-soluble, oil-insoluble soap or ester, or combination thereof, is injected into a subterranean formation. The soap or ester chemically reacts in the formation to produce a water-insoluble, oil-soluble soap or acid, which is effective over a relatively long period of time to selectively plug the water-rich portions of the formation over a relatively large area.

In one embodiment of the invention, a water-soluble soap is injected which reacts with metal ions in the connate water of the formation to yield a water-insoluble, oil-soluble soap.

In another embodiment similar to the first, metal ions in the form of a metal salt or otherwise are injected into the formation, and then a water-soluble soap is injected which reacts with those metal ions to yield a water-insoluble, oil-soluble soap.

In another embodiment, metal ions are injected as in the previously-mentioned embodiment, but in this embodiment are injected simultaneously with the water-soluble soap. In order to prevent premature reaction, the metal ions are complexed so that reaction will occur only at the elevated temperatures in the formation.

In still another embodiment, a water-soluble soap of a first water-insoluble acid is injected along with an ester of a stronger acid. The ester is hydrolyzed to yield the strong acid, which then reacts with the water soluble soap to yield the parent water-insoluble acid of the soap.

In all embodiments, the water-insoluble, oil-soluble soaps or acids formed by the reactions specified, are effective as economical selective plugging agents which reacts slowly and plug a large area of the porous waer-rich strata of the formation.

DETAILED DESCRIPTION OF PREFERRED EMBODIMENTS

The invention relates to selective plugging compositions and methods, which are effective to selectively plug a relatively large distance or area of a porous water-rich strata or portion of a formation, the plugging occurring over a relatively long time span.

The compositions provided comprise water-soluble soaps; in each instance these water-soluble soaps react in the formation to produce the plugging agent which may be a water-insoluble soap or acid.

The invention will be described in terms of several particularly preferred embodiments, which represent the best mode of the invention as known to the inventors at the time of this application.

In accordance with a first embodiment of the invention, a water-soluble soap is reacted with metal ions present in the connate water of the formation to yield a water-insoluble soap. It is quite common for connate water of a formation to contain available sodium ions as in the form of a brine solution. the connate water of many formations also contains other available metal ions, such as magnesium ions.

There are certain readily available and inexpensive highmolecular weight acids which form water-soluble soaps with certain metals, and water-insoluble soaps with other metals. For example, abietic acid, $C_{19}H_{29}COOH$ (with a phenanthrene ring system) is the major active ingredient of rosin, and is available as inexpensive commercial rosin. Abietic acid is not soluble in water, but the sodium soap, sodium abietate, is water soluble. Abietic acid is soluble in organic solvents.

The magnesium soap of abietic acid, magnesium abietate, is not water soluble, and this soap has been found to give superior results as a selective plugging agent. It plugs over a relatively long time, a relatively large distance, and its formation as indicated in this embodiment is extremely simple and inexpensive.

Thus, in a formation containing available magnesium ions in the connate water, the sodium soap of abietic acid may be injected into the formation whereupon the magnesium ions will react with the sodium soap, to produce the magnesium soap of abietic acid, which is water-insoluble, oil-soluble, and which is quite effective as a selective plugging composition.

As another example, the sodium soap of behenic acid, $CH_3(CH_2)_{20}COOH$, is water-insoluble although the potassium soap is water-soluble. Thus, by injecting the potassium soap of behenic acid into a formation containing available sodium ions, a reaction will occur which will yield the water-insoluble sodium soap which is effective as a selective plugging agent with the advantages described above.

The choice of the particular metal ions for any given situation will depend on a number of factors such as availability, cost (if added), and nature of the soap formed. For example, at low temperatures the magnesium soap of rosin is generally preferred over the calcium soap. However, calcium is preferred at temperatures above about 180°F, since the magnesium soap becomes too water soluble.

In accordance with another embodiment of the invention, when metal ions of the type desired are not readily available in the proper location in the formation, metal ions as in the form of a metal salt may be injected into the formation prior to the injection of the water-soluble soap. Thus, for example, magnesium chloride could be injected prior to injection of sodium abietate.

In accordance with another embodiment of the invention, the metal ions are injected along with the water-soluble soap. In order to prevent premature reaction of the metal ions with the soap, the metal ions are complexed so that they will not be free to react until the constituents are downhole.

For one example, if nickel ions are not present in the formation and it is desired to form the water-insoluble nickel soap of abietic acid, nickel may be complexed with ethylenediamine, $NH_2CH_2CH_2NH_2$ by adding nickel in powdered or other suitable form to the liquid ethylenediamine. The complexed nickel is thus not available to react with sodium abietate before the constituents are injected into the formation. After entry into a formation in which the temperature is at least about 150°F, however, the nickel ethylenediamine complex breaks down freeing nickel ions for reaction with the sodium soap, to yield the nickel soap of abietic acid. This nickel soap is water-insoluble, oil-soluble, and is effective as a selective plugging agent with the advantages listed above.

Another example of this embodiment of the invention is provided by the use of zinc rather than nickel, with the other constituents as indicated above.

In yet another embodiment of the invention, a water-insoluble acid is produced in the formation as a selective plugging agent, after injection of (1) a water-soluble soap of a first, water-insoluble acid, and (2) an ester of a second acid, stronger than the first acid. Upon being injected into a formation at a temperature in excess of the hydrolyzation temperature of the ester, generally about 150°F, the ester will hydrolyze into its alcohol and acid constituents. The acid constituent of the ester, being stronger than the parent acid of the soap, will then react with the soap to yield the parent acid of the soap. This parent acid, being water-insoluble and oil-soluble is effective as a plugging agent to plug over a large area and over a relatively long period of time.

Care must be exercised to assure that the original acid regenerated is one which has a sufficiently high melting point. The exact melting point necessary depends upon the temperature in the formation; in the particular formations with which applicants have worked, this temperature has been about 180°F. Thus, although pure abietic acid may have a sufficiently high melting point to be of use in a particular formation, that acid is not generally available in the pure state, and rosin acid which is commercially available has a melting point which is too low for the formations utilized by applicant. Thus, it is necessary to utilize an acid other than rosin, and applicants chose for the following example a dimerized rosin acid the principal constituent of which is dimerized abietic acid. These dimers have two acid molecules.

An example of this latter embodiment of the invention would include the injection of the sodium soap of a dimerized rosin acid, (available commercially as "Dimerex" from Hercules, Inc.), and ethyl acetate. Upon entering the formation at temperatures greater than about 150°F, the ethyl acetate is hydrolyzed into ethyl alcohol and acetic acid. The acetic acid then reacts with the sodium soap to yield the dimerized rosin. The dimer acid is water-insoluble and oil-soluble and is effective as a selective plugging agent.

It may be desired to add a flocculating agent, such as ammonium phosphate, to flocculate the precipitate.

To further illustrate the invention, applicants have performed several laboratory experiments which have given surprisingly good results on permeability reduction. The examples which follow, which should not be considered as limiting the invention but rather only as exemplary of various of the embodiments, are based on those laboratory results.

In these experiments, a core of Berea sandstone was employed, the core being 2 inches long and 1 ½ inches in diameter. This core was completely encased in a temperature-resistant epoxy resin.

Permeabilities were measured at ambient temperature, then the cores were allowed to reach equilibrium at 180°F (simulating field conditions) for the experiments. Following the experiments, the cores were cooled and the permeabilities again measured at ambient temperature. The final permeability measurements were compared to the initial measurements to determine the permeability loss in each instance. Permeability was measured in each instance by timing the rate of flow of water through the sample, maintaining a constant pressure in the sample.

The field water employed was from the Ventura field in Southern California.

EXAMPLE I

After the sandstone core had reached equilibrium at 180°F, about 20 ml. of field water containing not less than 8,000 mg./l. sodium, 450 mg./l. calcium, and 100 mb./l. magnesium, was injected into the core, followed by about one pore volume (about 3 ml.), of an aqueous solution of 0.5 percent sodium abietate prepared in deionized water.

Permeability loss was measured at 66 percent.

EXAMPLE II

After the core had reached equilibrium, about 20 ml., salt water, containing not less than 20,000 mg./l. sodium chloride, was injected followed by about one pore volume (about 3 ml.) of 0.5 percent solution of potassium behenate prepared in deionized in water.

Permeability loss was 48.5 percent.

EXAMPLE III

A zinc ethylenediamine complex was formed by adding ethylenediamine to a concentrated solution of zinc sulfate, until the zinc precipitate completely dissolved with an excess of around 10-20 percent of the ethylenediamine. The complex was then dissolved in sodium abietate solution to give a final composition of 0.5 percent sodium abietate and 0.225 percent zinc complex (90 percent of sodium abietate stoichiometrically). Solutions of this type are stable for 1-2 days at ambient temperature and for several hours at 180°F.

Several pore volume (about 25 ml.) of this mixture were injected into the core. The core was allowed to stand at 180°F overnight, then cooled to ambient temperature.

Permeability loss was 47 percent.

EXAMPLE IV

Dymerex, a dimer acid produced from rosin available from Hercules, Inc., has a melting point of about 250°F. The potassium soap of this dimer can be readily prepared. Several pore volumes (about 25 ml.) of an aqueous solution of 0.5 percent potassium Dymerex solution containing 1.5X stoichiometric ethyl acetate and a small amount of ammonium phosphate (to flocculate the precipitate) were injected into the core at 180°F. The core was allowed to stand at 180°F overnight, then cooled to ambient temperature.

Permeability loss was measured at 85 percent.

Table I presents a summary of laboratory experiments performed by applicant. These experiments utilized formation water and oil from the Ventura field in California, at a temperature of about 180°F. The Ventura reservoir is a moderately saline high temperature reservoir.

TABLE I

RESULTS OF EXPERIMENTS WITH HIGH MOLECULAR WEIGHT SOAPS FOR SELECTIVE PLUGGING

| | Process Name | Principal Ingredient (Trademark) | Injected Solution Form | Reacts With | Other Chemicals Used | Function of Other Chemicals | Reaction Product | 180° F NaCl Solution | Production Field Water |
|---|---|---|---|---|---|---|---|---|---|
| 1) | Behenic Acid | Hydrofol 2022-55 (Ashland Chemical) | Potassium Soap | Sodium ion in salt water | Potassium hydroxide | To make K-soap | Sodium behenate | ppts with over 10,000 ppm | ppt |
| 2) | Dimerized Stearic Acid | Hystrene 3675C (Humko) | Potassium Soap | Sodium ions in salt water | Potassium hydroxide | To make K-soap | Sodium soap | ppts with over 35,000 ppm | ppt |
| 3) | Rosin Soap | Dresinate XX (Hercules Inc.) | As is | Calcium or magnesium in formation water | None | | Calcium rosinate | ppts with over 30,000 ppm | ppt |
| | | | As is | Zinc ion released from complex | Zinc sulfate / Ethylenediamine | To provide reactant / To complex zinc | Zinc rosinate | ppts with over 30,000 ppm | ppt |
| 4) | Modified Rosin | Pentalyn 255 (Hercules Inc.) | | | Potassium hydroxide | To make soap | Modified rosin | ppts with over 40,000 ppm | ppt |
| 5) | Modified Rosin | Pentalyn 261 (Hercules Inc.) | Potassium Soap | An acid created in situ | Triacetin or methyl formate | To provide acid when ester hydrolyzes | Modified rosin | ppts with over 40,000 ppm | ppt |
| 6) | Dimerized (Hercules Inc.) | Dymerex (Hercules Inc.) | | | $(NH_4)_2H PO_4$ | To flocculate precipitate | Dimerized rosin | ppts with over 25,000 ppm | ppt |

| | Injection Field Water | Loss of Permeability in Core Test | Effect on Viscosity of Oil | Melting Point of Precipitate | Approximate Cost/bbl With 0.5% Principal Ingredient | Comments |
|---|---|---|---|---|---|---|
| 1) | None | 48.5% (high salt) | Very large increase | 300° F | $.55 | Solution of KOH and acid requires no heat in fresh water. |
| 2) | None | 45.5% (high salt) | No increase | 300° F | $.54 | Same as behenic, except soft water. |
| 3) | ppt | 66% (Field injection water) | Increases slightly | 300° F | $.28 | Dresinate comes slightly underbased, with 5 oz. caustic per barrel, clear solution in soft water. No heat. |
| | ppt | 47% (fresh water) | Forms fairly stable emulsion | 300° F | $.67 | No mixing problem in salt water. No heat desirable. |
| 4) | None | Not tested | Increases several times | 230° F | $.79 | Can use saline water. No heat desirable. |
| 5) | None | Not tested | Increases several times | 215% F | $.85 | Same as Pentalyn 255. |
| 6) | ppt | 85% (fresh water) | Increases slightly | 250° F | $.70 | Softened water. Requires 200°F to make potassium soap. Cool before adding ester. |

Although the invention has been described in terms of particular embodiments which applicant believes to represent the best modes of the invention at the time of this application, it will be recognized by those of skill in the art that various changes may be made in the composition and method embodiments of this specification without departing from the scope of the invention as defined in the following claims.

What is claimed is:

1. A method for selectively plugging water-rich strata of a subterranean formation containing strata which are water-rich and other strata which are oil-rich, said water-rich strata containing a significant amount of metal ions, and said strata having at least one borehole therein, comprising:
   providing a dilute aqueous composition of a water-soluble, oil-insoluble metal soap of a high-molecular-weight acid;
   passing said composition into said borehole;
   injecting said composition into said formation at a pressure sufficient to overcome the natural formation pressure;

reacting said soap with the metal ions in said water-rich strata to form as a reaction product, a second metal soap of said acid, said second metal soap being water-insoluble and oil-soluble, said reaction product being effective to greatly reduce the permeability of said water-rich strata, over a relatively long distance and over a relatively long period of time.

2. The method in accordance with claim 1, wherein said acid is selected from the group consisting of rosin, abietic and behenic.

3. The method in accordance with claim 1, wherein said soap is the sodium soap of commercial rosin.

4. The method in accordance with claim 1, wherein said soap is the potassium soap of behenic acid.

* * * * *